United States Patent
Sen et al.

(10) Patent No.: US 7,548,911 B2
(45) Date of Patent: Jun. 16, 2009

(54) DIAGNOSING PROBLEMS IN DISTRIBUTED SYSTEMS

(75) Inventors: Siddhartha Sen, Bellevue, WA (US); Joseph M. Joy, Bangalore (IN); Nikolai Tillmann, Redmond, WA (US); Colin L. Campbell, Seattle, WA (US); Margus Veanes, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 625 days.

(21) Appl. No.: 11/140,061

(22) Filed: May 28, 2005

(65) Prior Publication Data

US 2006/0282419 A1    Dec. 14, 2006

(51) Int. Cl.
*G06F 7/00* (2006.01)
*G06F 11/00* (2006.01)
*G06F 9/44* (2006.01)

(52) U.S. Cl. .............................. 707/4; 714/38; 717/104
(58) Field of Classification Search ....................... None
See application file for complete search history.

(56) References Cited

U.S. PATENT DOCUMENTS

| | | | | |
|---|---|---|---|---|
| 5,544,359 A | * | 8/1996 | Tada et al. | 707/202 |
| 6,091,896 A | * | 7/2000 | Curreri et al. | 717/125 |
| 6,216,206 B1 | * | 4/2001 | Peled et al. | 711/133 |
| 6,304,904 B1 | * | 10/2001 | Sathyanarayan et al. | 709/224 |
| 6,460,036 B1 | * | 10/2002 | Herz | 707/10 |
| 6,606,671 B1 | * | 8/2003 | McNamer et al. | 710/18 |
| 6,708,169 B1 | * | 3/2004 | Berry et al. | 707/7 |
| 6,718,321 B2 | * | 4/2004 | Birrell et al. | 707/2 |
| 6,766,511 B1 | * | 7/2004 | Berry et al. | 717/128 |
| 6,988,263 B1 | * | 1/2006 | Hussain et al. | 717/128 |
| 7,124,272 B1 | * | 10/2006 | Kennedy et al. | 711/173 |
| 7,380,239 B1 | * | 5/2008 | Srivastava et al. | 717/128 |
| 2003/0140282 A1 | * | 7/2003 | Kaler et al. | 714/39 |
| 2003/0159087 A1 | * | 8/2003 | Grieskamp et al. | 714/37 |
| 2003/0159132 A1 | * | 8/2003 | Barnett et al. | 717/124 |
| 2003/0226038 A1 | * | 12/2003 | Raanan et al. | 713/201 |
| 2003/0237027 A1 | * | 12/2003 | Cook | 714/38 |
| 2004/0010754 A1 | * | 1/2004 | Jones | 715/513 |
| 2005/0050536 A1 | * | 3/2005 | Grieskamp et al. | 717/162 |
| 2006/0161404 A1 | * | 7/2006 | Campbell et al. | 703/2 |
| 2006/0195297 A1 | * | 8/2006 | Kubota et al. | 702/187 |
| 2006/0230391 A1 | * | 10/2006 | Alexander et al. | 717/130 |
| 2006/0259605 A1 | * | 11/2006 | Altenhofen et al. | 709/223 |
| 2008/0071797 A1 | * | 3/2008 | Thornton | 707/10 |

(Continued)

OTHER PUBLICATIONS

Glasser, et al., "Abstract Communication Model for Distributed Systems" article, IEEE Transactions on Software Engineering, vol. 30, No. 7, Jul. 2004, pp. 458-472.

(Continued)

*Primary Examiner*—Christian P. Chace
*Assistant Examiner*—Tarek Chbouki
(74) *Attorney, Agent, or Firm*—Workman Nydegger

(57) ABSTRACT

Diagnosing problems in distributed systems. In one aspect, a model of a distributed system defines trace statements are generated by various nodes of the system and placed in log files. The log files are sent to an automatic validator that attempts to reconcile the trace statements against the model. Results of the attempt are indicated. In another aspect, trace statements are received by a multiplexer that creates an ordering via sequence numbers. The ordering is forwarded to an automatic validator to determine whether the trace statements indicate correct behavior.

16 Claims, 8 Drawing Sheets

OTHER PUBLICATIONS

Campbell et al.-US Application and drawings, U.S. Appl. No. 11/085,624, filed Mar. 18, 2005.

Tillmann et al.-US Application and drawings, U.S. Appl. No. 10/650,245, filed Aug. 27, 2003.

* cited by examiner

DIAGNOSING PROBLEMS IN DISTRIBUTED SYSTEMS

BACKGROUND

Many software systems go through extensive testing before they are released in an attempt to eliminate bugs and improve performance. Often, testing is done ad-hoc. A tester creates a suite of tests based on past experience and/or previously encountered bugs. To create the suite of tests, the tester will often write a testing application that exercises the program in a variety of ways. This testing application is written such that at certain points, messages are logged to indicate success or failure of a particular test.

As more programs are becoming distributed across multiple machines, testing the programs is becoming more difficult. Furthermore, it may not be practical or feasible to manually diagnose problems based on logged messages collected from multiple machines. Very often, manual diagnosis requires significant time spent by experts who must have a detailed understanding of the inner workings of the program.

SUMMARY

Briefly, aspects of the subject matter described herein relate to diagnosing problems in distributed systems. In one aspect, a model of the distributed system defines trace statements that are generated by various nodes of the distributed system and placed in log files. The log files are sent to an automatic validator that attempts to reconcile the trace statements from several log files against the model of the distributed system. The problem lies in finding a global order of the trace statements from local log files that satisfies the global model. Results of the attempt are indicated. In another aspect, trace statements are received in real-time by a multiplexer that creates an ordering via sequence numbers. The ordering is forwarded to a validator to determine whether the trace statements indicate correct behavior.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "one or more aspects". Identifying aspects of the subject matter described in the Detailed Description is not intended to identify key or essential features of the claimed subject matter.

Other aspects will become apparent from the following Detailed Description when taken in conjunction with the drawings, in which:

DETAILED DESCRIPTION

Exemplary Operating Environment

Figure 1:
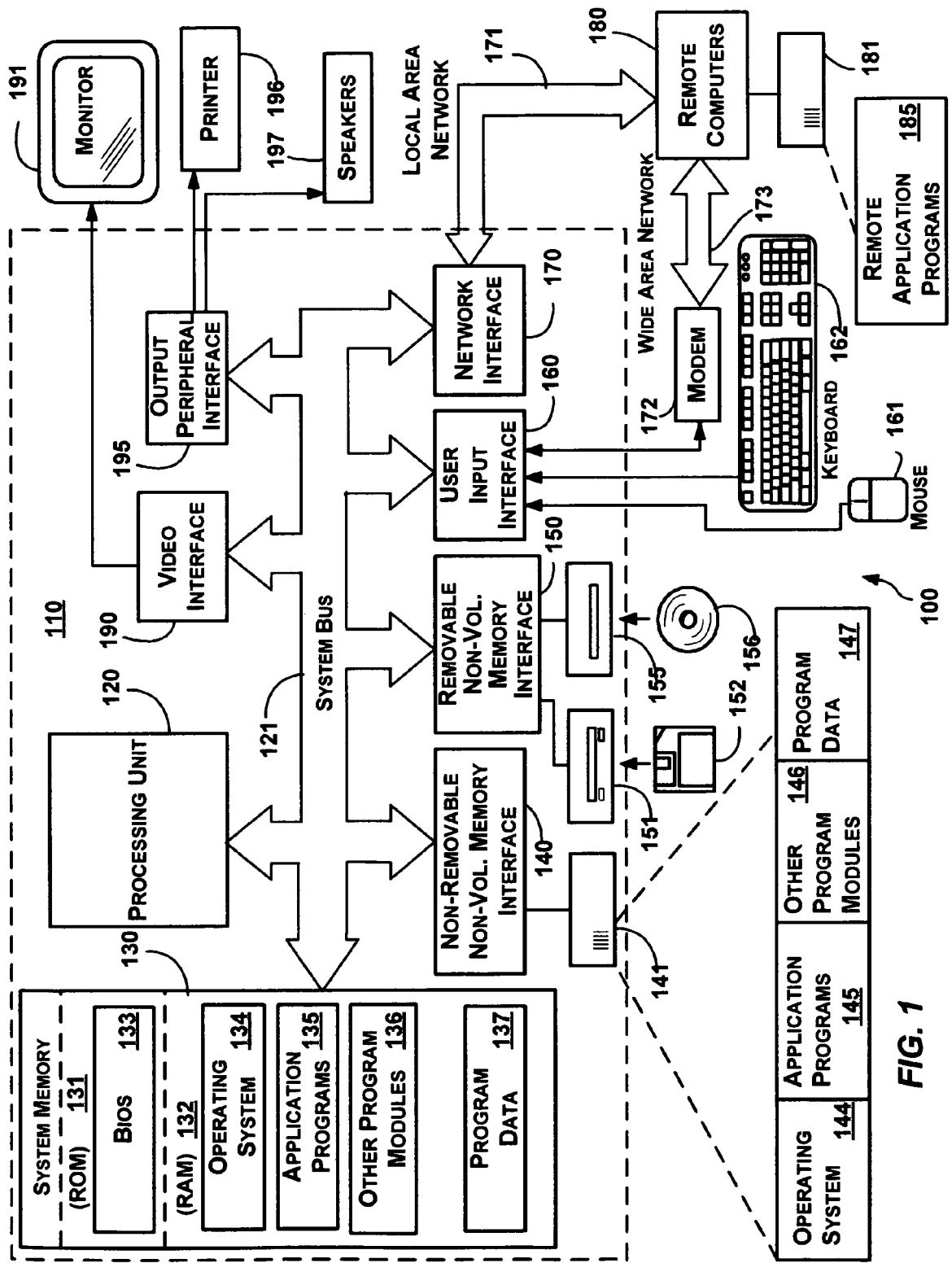
FIG. 1 is a block diagram representing a computer system into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tae cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Diagnosing Problems

Figure 2:
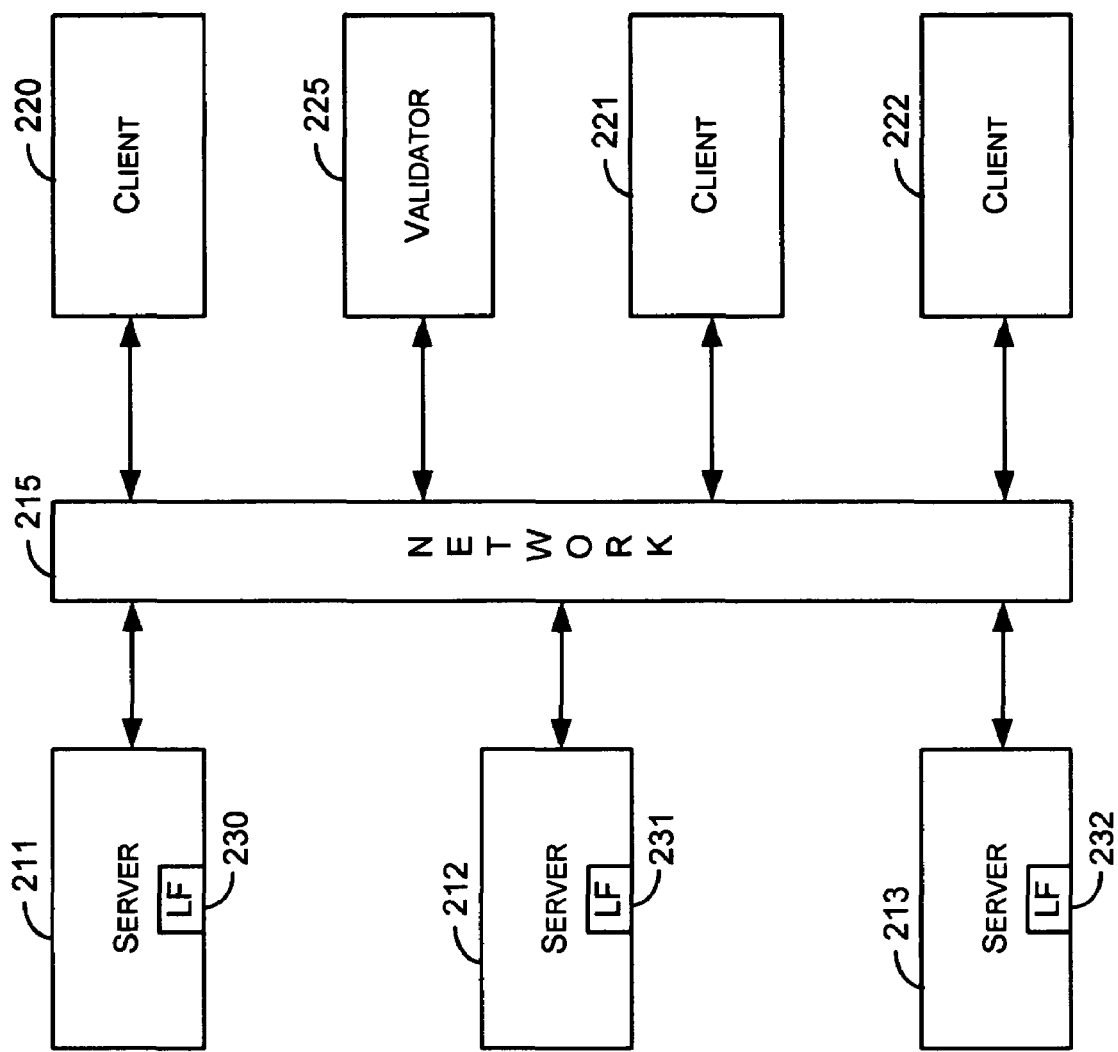
FIG. 2 is a block diagram that generally represents an environment in which aspects of the subject matter described herein may operate.

FIG. 2 is a block diagram that generally represents an environment in which aspects of the subject matter described herein may operate. The environment may include servers 211-213, clients 220-222, and a validator 225 connected by a network 215. The servers 230-232 may be instrumented such that they produce log files 230-232, respectively, as they execute.

Log files (e.g., the log files 230-232) may comprise data in a persistent storage (e.g., a hard disk), a stream or pipe, which is essentially a serialized data stream that may reside in memory or in some combination of memory and the network, and the like. In online scenarios (described below), the log files 230-232 may be streamed directly to a multiplexer (described below) without being written to non-volatile storage.

In one embodiment, each of the servers 230-232, clients 220-222, and the validator 225 may comprise a general-purpose computing device such as the computer 110 of FIG. 1. In other embodiments, one or more of the servers 230-232, clients 220-222, and the validator 225 may comprise processes or threads that reside together on one physical device. At times, each of the servers 211-213 may act as clients. Similarly, at times, each of the clients 220-222 may act as servers.

The network 215 comprises any one or more mechanisms that may be used to transmit messages among the components shown in FIG. 2. The network 215 may include a wired or wireless computer-readable medium as described in conjunction with FIG. 1 and may include media that may be used to transmit messages from one physical machine to another. In embodiments in which one or more of the components reside together, the network 215 may include memory locations used to transmit a message from one component to another as well as wired or wireless media used to transmit messages from a component on one physical machine to a component on another physical machine.

In some embodiments, more than one of the servers 211-213 may be involved in satisfying a request from one of the clients 220-222. For example, in one embodiment, one of the servers may receive requests from the clients 220-222 and load balance the requests to other servers. Each of the other servers may send the requests to yet other servers. One server may fulfill part of a request while another server may fulfill another part of the request. In general, one or more of the servers 211-213 may perform actions to satisfy a client request without departing from the spirit or scope of aspects of the subject matter described herein.

A distributed system may comprise the collection of servers 211-213 and clients 220-222 or any other number of clients and/or servers (sometimes generically referred to as "nodes").

The validator 225 may collect the log files 230-232 from each of the servers 230. As described in more detail below in conjunction with FIGS. 4-6B, the validator 225 may then use information in the log files 230-232 to verify that the actions performed by the servers 211-213 are correct. This may be useful in diagnosing problems such as program incorrectness, performance issues, or otherwise in the distributed system.

Figure 3:
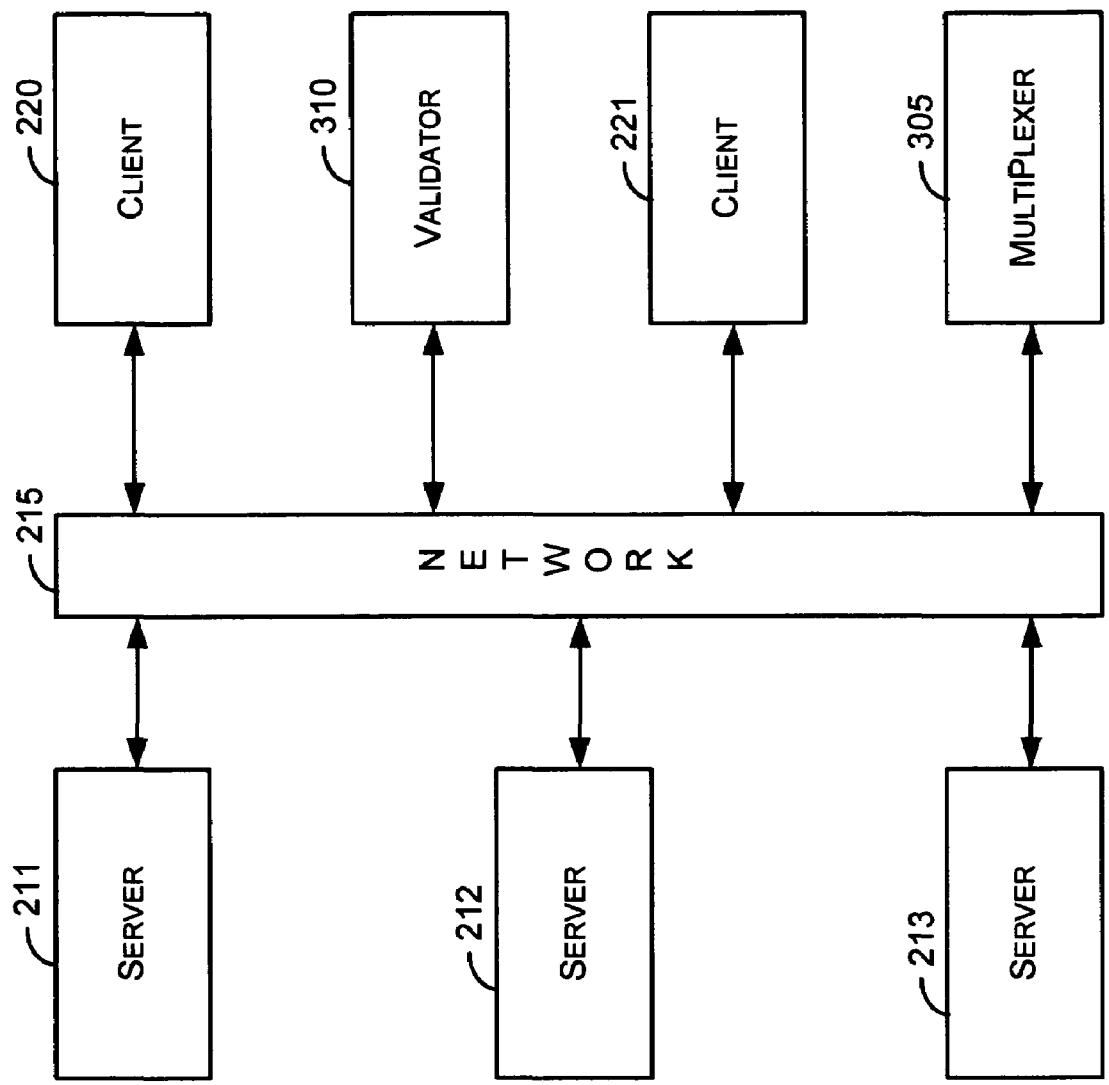
FIG. 3 is a block diagram that generally represents another environment in which aspects of the subject matter described herein may operate.

FIG. 3 is a block diagram that generally represents another environment-in which aspects of the subject matter described herein may operate. In this environment, the servers 211-213 may each send logging information as it occurs to the multiplexer 305 which then provides a totally ordered log file to the validator 225. The validator 225 may then use information in the log files 230-232 to verify whether the actions performed by the servers 211-213 are correct.

The multiplexer 305 may reside on one of the servers 211-212, on one of the clients 220-221, on the validator 225, and/or on a separate machine without departing from the spirit or scope of aspects of the subject matter described herein.

Figure 4:
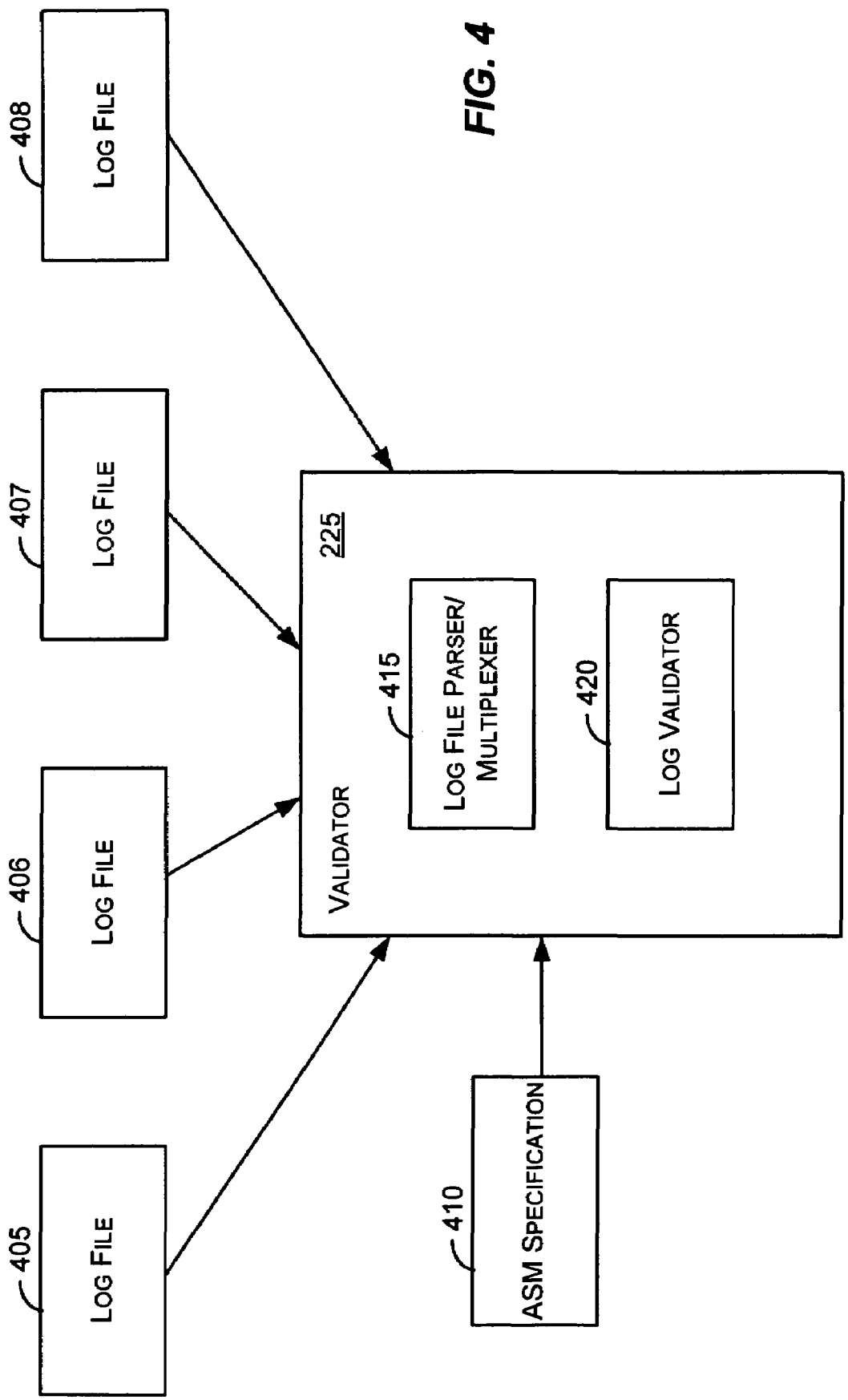
FIG. 4 is a block diagram that generally represents an exemplary validator and inputs thereto in accordance with aspects of the subject matter described herein.

FIG. 4 is a block diagram that generally represents an exemplary validator and inputs thereto in accordance with aspects of the subject matter described herein. The validator contains a global model of the system being validated. This model comprises one or more objects that each represents some aspect of the distributed system. In this context, an object may be any conceptual entity and need not be limited to objects that include data and/or methods. Indeed, a conceptual entity is anything that may be modeled by a set of states and transitions between pairs of the states. This conceptual entity represents any aspects of the system that is being validated, based on the specifications of the system. For example, the behavior of a stop light with three lights (e.g., red, yellow, and green) may comprise a conceptual entity. As another example, a TCP connection that is established, migrated to another machine, used to transmit messages, and then destroyed may also comprise a conceptual entity.

The lifecycle of an object may be modeled as a set of states and transitions between pairs of the states. A transition may be caused by one or more events that occur in a given state. One way of recording these states and transitions is by encoding them as an Abstract State Machine (ASM) specification 410. The ASM specification may be encoded so as to be executable. For example, an ASM specification may be encoded in AsmL, Spec#, or any other modeling or programming language existing or to be developed which allows execution of the ASM specification 410. When so encoded, the ASM specification 410 may be used to drive the log validator 420 based on received events. Hereafter, the state machine created from an executable specification is referred to as an ASM.

Unlike a Finite State Machine (FSM), an ASM is allowed to have state variables of arbitrary complexity. Formally, an ASM state is a first-order structure as defined by mathematical logic. Furthermore, transitions may read or modify these variables and interact with the external environment in a flexible way. An ASM may be nondeterministic. In general, an FSM may be modeled as an ASM, but the reverse may not be true.

Note, that in modeling the lifecycle of the object, not all aspects of an object's state need to be modeled.

A more detailed model of the system being validated allows for validation of finer aspects of the system. However, such a detailed model may be time consuming to prepare and may introduce errors of its own. Thus, aspects of the subject matter described herein allow the user of the system the flexibility of choosing the level of detail with which to model the system.

After an object is modeled, program code within the system being diagnosed may be instrumented with trace statements that log the events corresponding to the ASM model. The trace statements are inserted at the specific locations in the program code that actually implement the functionality that corresponds to the events in the ASM model.

The logged events are fed to the validator, which attempts to check that the events represent a valid execution trace of the ASM model. In some cases, events are not logged in the exact sequence in which they occurred. This can happen either because the events were logged by multiple threads within the same physical server, or by one or more threads on more than one server. In cases in which the exact sequence of occurrence of the events can not be determined, the validator tries different permutations of the events to obtain a valid serialization of the events. The validator may use a state space searcher (as described in more detail in conjunction with FIGS. 6A and 6B) to obtain a valid serialization.

The term "log" as used herein may mean writing data to a log file or sending a message to a multiplexer associated with the validator. Writing data to a log file which is collected later is sometimes referred to as an "offline scenario," where validating the behavior of the object may be performed at a time later than when the log file was created. Sending a message to a multiplexer which then attempts to create a total ordering of the events associated with multiple messages and to present these totally ordered events to the validator is sometimes referred to as an "online scenario" as validating the behavior of the object may be performed concurrently with program execution.

Each trace statement may identify the object instance with which the event is associated as well as the node (e.g., machine) on which the event was generated. An object instance may comprise a specific instance of the object. For example, a machine may be involved with multiple TCP connections over a period of time. Each TCP connection may be an instance of a TCP connection object. In some embodiments (e.g., online scenarios), each trace statement may also include an additional counter or sequence number that may be used to deduce an ordering of the events associated with the object instance.

When the instrumented program code is executed, the log files 405-408 may be generated from the trace statements. In each log file, the events pertaining to an object instance may be recorded sequentially. Events pertaining to multiple object instances may be recorded in each log file. These other events may be filtered out of the log file to obtain the events pertaining to a selected object instance.

In the offline scenario, the log files 405-408 may be viewed as physical files that reside on nodes of a network (even though the log files 405-408 may actually comprise a serialized data stream that resides in memory or a combination of memory and a network as described previously). In the online scenario, the log files 405-408 may be viewed as streams of partially ordered events that are forwarded to a multiplexer which then presents a totally ordered stream of events from all logging entities to the validator 225. In the offline scenarios, a log file parser/multiplexer 415 may collect and group related trace statements across multiple logs, and present them to the log validator 420 in a format that the log validator 420 understands. In offline scenarios, the log file parser/multiplexer 415 should not attempt to reorder the trace statements within a given group (as a correct ordering of the trace statements may be attempted by the log validator 420 as described below).

"Groups" of trace statements refer to trace statements that are related in some way (e.g., that are part of the same trace). Usually, the trace statements that comprise a group are all associated with the same object instance.

In online scenarios, the log file parser/multiplexer 415 may not wait for the arrival of all trace statements belonging to the same group. Instead, it may use the information encoded in each trace statement to produce a valid serialization of events across all nodes, which may then be sent to the log validator 420 in real-time. A valid serialization is one which satisfies any constraints on ordering that may be associated with the objects (e.g., for a particular object instance, an event with a smaller sequence number cannot come after an event with a larger sequence number). In online scenarios, the log file parser/multiplexer 415 and the multiplexer (e.g., multiplexer 305 of FIG. 3) may be thought of as synonymous.

In offline scenarios, the log validator 420 may use a state space searcher (as described in more detail in conjunction with FIGS. 6A and 6B) to validate groups of trace statements as sent by the log file parser/multiplexer 415. The state space searcher may attempt different orderings of the trace statements in a given group until a valid ordering is found. If no valid ordering exists, then an error message from the most-successful ordering (e.g., ordering with longest chain of correct states and transitions of the ASM specification 410) may be reported.

In online scenarios, the log validator 420 need not attempt any reorderings of the trace statements, because the event stream produced by the log file parser/multiplexer 415 should already be serialized. Further, since the events may be provided to the log validator 420 in real-time, the log validator 420 may need to track the state of each object instance in real-time or it may lose state information. Once an object instance has been validated (or, conversely, an error has been found), the log validator 420 may stop tracking the state of the object instance.

The offline scenarios are intended to serve as a post-processing tool wherein the bulk of the validation work is performed after the application has been run. As a result, performance of the validator 225 may not be a critical factor. The online scenarios, on the other hand, may validate event streams in real-time, and so performance may be a larger factor in the design of validators that work in online scenarios.

An Exemplary Executable ASM Specification

As mentioned previously, an ASM specification may be encoded in a language that allows the ASM specification to be executed. One exemplary language that allows this is Spec#. An example of encoding an object in Spec# is described below, but it will be understood that an ASM specification may be encoded in other languages (now existing and later developed) without departing from the spirit or scope of aspects of the subject matter described herein.

Using Spec#, an object may be modeled as a class that contains a set of instance variables and methods. The instance variables may represent the state variables of the object's ASM and the methods may represent the transitions between states. Each method may be named after the event to which it corresponds (e.g., the event that causes the transition to occur) such that there is a one-to-one mapping between methods and events. Since only a subset of all possible events may be valid for any given state, each method may be prefaced with a set of preconditions that allow the underlying transition to take place if it is legal. In Spec#, preconditions may be expressed using "requires" statements.

For example, suppose that a traffic light is selected as an object to model as an ASM. To model the lifecycle of a traffic light as a Spec# class, one instance variable may store the color of the light (the only state variable) and several methods may model the transitions between different colors of the light. Each transition (color change) may be modeled using a separate method that corresponds to the event that caused it. Thus, one Spec# implementation of the traffic light model may be defined as:

```
enum Color
    RED,
    YELLOW,
    GREEN
class TrafficLightASM
    Color currentColor = null;
    TrafficLightASM(Color initialColor)
        currentColor = initialColor;
```

-continued

```
void changeToRed( )
    ...
void changeToYellow( )
    ...
void changeToGreen( )
```

Since a subset of the above events may be enabled in the current state of the traffic light (i.e., the value in currentColor), each method above may be prefaced with a set of preconditions. For instance, the changeToRed method may be prefaced as follows:

```
    ...
void changeToRed( )
    requires currentColor = Color.YELLOW;
    currentColor = Color.RED;
    ...
```

As a result, if the value in currentColor is anything but Color.YELLOW when the changeToRed method is called, the method's precondition is violated and an exception may be thrown. Further, when a precondition is violated, the transition may not be allowed (e.g., the value in currentColor may not be changed).

It will be recognized that the traffic light model described above is rather simplistic. Other executable ASM models may be much more complicated, with multiple state variables and methods that take one or more arguments as input. Furthermore, if support for nondeterministic exploration of the model is needed (e.g., in the context of offline scenarios, to attempt different orderings of the input trace events) additional code may also be added. Extensions for nondeterminism are described below.

Trace Statements

As mentioned previously, program code may be instrumented with a trace statement wherever a significant event in the object's lifecycle occurs. An event is "significant" if it corresponds to a transition in the ASM. In Spec#, a transition may be encoded with a method. Thus, one strategy to ensure proper instrumentation is to take the list of methods in the ASM specification and find, for each method, all places in the application code where the corresponding event occurs. In the traffic light example, this would involve searching for all places in the code of the control system that controls the light where the color of the light is changed. In the traffic light example, these places correspond to the changeToRed, changeToYellow, and changeToGreen methods.

This strategy does not guarantee complete or correct instrumentation, since there may be code paths in the application that have not been covered or other errors in the application code. However, that does not void the strategy as it may expose such errors and help the programmer locate them.

To validate an object's behavior, the trace statements may encode all event information necessary to affect the corresponding transition of the ASM. More specifically, the trace statements may comprise any one or more of the following (or other data):

1. An identifier that identifies the object instance with which the event is associated;

2. An identifier that identifies the node on which the event occurred;

3. An identifier that identifies the thread context that caused the event;

4. A label that identifies the transition;

5. Any parameters associated with the transition including the values of any state variables that have changed; and 6. A sequence number of the event.

In general, the data stored in the log file should be enough so that it may be determined if the transition is allowed by the ASM specification.

For ease, a trace statement may encode the name of the corresponding method in the ASM specification. The sequence number of the event (i.e., item 6 above) may be included so that a multiplexer may order the events associated with a given object instance.

In a distributed environment, over time, object instances may span multiple threads both within a node and across nodes. In such cases, it may be desirable for the sequence number to "travel" with the object instance. This may be done by associating a counter with the object instance and sending it together with the object when the object moves to another node. Within a node, proper ordering of the events (and corresponding updates to the sequence number) may be achieved with the use of locks. Between nodes, proper ordering may be achieved automatically through the use of message passing primitives. For example, if one node updates the sequence number of an object instance before sending the instance to another node, then any update by the other node is guaranteed to occur after the first node's update. Using these techniques, the resulting order of events is a total order with respect to the object instance, and a partial order with respect to the events of all object instances. This partial ordering may be sufficient for the log file parser/multiplexer to produce a consistent, global serialization of events. If the partial ordering does not contradict itself, then it is typically possible to produce one or more global serializations of events.

Beyond the items discussed above, the programmer is free to include any additional information in each trace statement. It may, however, be a good idea to keep trace statements as succinct as possible (e.g., to reduce the size of generated log files or transmitted messages).

Various formats may be used for encoding the contents of trace statements. Below, an example of encoding the contents of trace statements using XML is provided, but it will be understood that other formats may be used without departing from the spirit or scope of aspects of the subject matter described herein. The following XML elements and subelements may be useful in encoding the contents of trace statements:

1. A parent element for the event; for instance, in the traffic light example above, this may be <trafficlight-log-event>;

2. A child element for the identifier of the object instance the event is associated with; for example, <trafficlight-id>;

3. A child element for the event itself; for example, <trafficlight-event>.

4. A subelement of the element in item 3 above identifying the node on which the event occurred and the currently executing thread; for example, <node> with attribute "threadID".

Using the example XML tags above, a typical trace statement for the traffic light system might look as follows:

```
<trafficlight-log-event>
    <trafficlight-id>
        ...
    </trafficlight-id>
    <trafficlight-event>
        <node threadID="XXX">...</node>
```

-continued

```
    ...
    </trafficlight-event>
</trafficlight-log-event>
```

The contents of the individual elements (attributes, subelements, and the like) may be as simple or complex as necessary. For example, if the ASM of the traffic light model included one or more state variables, a <state-var> subelement may be used within the <trafficlight-event> element to encode the state variables. In the case of online scenarios, a subelement may be used within the <traffic-light-id> element to store the sequence number of the object instance. The sequence number may be used by a multiplexer to order events associated with the object instance.

Log File Parser

After the program code has been instrumented, the next step is to execute the code and generate the trace events on every node. In offline scenarios, the events may be written to the log files 405-408 before being collected by the log file parser/multiplexer 415. The log file parser/multiplexer 415 may preprocess and consolidate the events before sending them to the log validator 420.

Offline Scenarios

In offline scenarios, the log file parser/multiplexer 415 may read the trace statements from each log file 405-408 and extract the encoded events. For example, in the traffic light example described previously, the events may correspond to the <trafficlight-event> elements. A tracing architecture (e.g., WMI) may prepend each trace statement with a timestamp and some other information about the source of the event. This additional information may or may not be used without departing from the spirit or scope of aspects of the subject matter described herein.

After extracting the encoded events, the log file parser/multiplexer 415 may consolidate the events collected from the different log files 405-408. In this context, "consolidate" means that events associated with the same object instance are grouped together. In a distributed environment, these events may be spread out within a given log file as well as across multiple log files, since the program code may handle several object instances at the same time and may be distributed over several nodes. The log file parser/multiplexer 415 may use the encoded object identifier to determine with which object instance the event is associated. For example, in the traffic light example described previously, the contents of the <trafficlight-id> element may be used.

Once the log file parser/multiplexer 415 has consolidated the events by object instance, it may output these events (without any further reordering) to a processed log file. This file may then be input into the log validator 420.

Online Scenarios

In online scenarios, trace events may be sent to a multiplexer by individual nodes using an RPC-like (or other) protocol. In particular, when an event is generated on a node, a remote procedure call may be made to the multiplexer conveying all the encoded event information. The multiplexer may maintain a separate, in-memory FIFO queue of events from every thread of every node, distinguished by the node and thread IDs embedded in the arriving events. Since any two threads of a distributed application, whether on the same node or different nodes, may potentially run in parallel, these queues represent a partial ordering of all events generated during a given program execution.

The multiplexer may choose events from per-thread event queues in a way that satisfies inter-thread ordering constraints (as specified by the lock-incremented or message passing-incremented sequence numbers encoded in the events). Each chosen event may then be sent, in real-time, to the log validator 420 for validation. If, at any time, it is impossible to choose an event from one of the queues without violating the inter-thread ordering constraints, then a test failure may occur. This may indicate that the instrumented program has reported contradictory ordering constraints.

The multiplexer may provide a linearization of the partially ordered events to the log validator 420 for validating object behavior. An exemplary algorithm for linearizing partially ordered events is described in a United States Patent Application entitled "CONFORMANCE TESTING OF MULTI-THREADED AND DISTRIBUTED SOFTWARE SYSTEMS," filed on Mar. 18, 2005, Ser. No. 11/085,624 which application is assigned to the assignee of this application.

Log Validator

Once the processed log file has been generated (in an offline scenario) or the event queues have been serialized (in an online scenario), the processed events may be validated against an ASM specification of the object.

In offline scenarios, the log validator 420 may read groups of events from the processed log file and attempt to validate each group using the ASM specification 410. The actual validation may be complicated as the correct ordering of the events (in a given group) may not be known. The log validator 420 may output the results of the validation to a validation log file, to a screen, printer, or other process.

In online scenarios, the log validator 420 may assume a valid serialization (ordering) has been produced by the log file parser/multiplexer 415. A stream of events provided by the log file parser/multiplexer 415 may drive the ASM. Since the events of different object instances may be interleaved, however, the log validator 420 may need to track the state of each object instance in real-time.

Validating Events Associated with an Object in Offline Scenarios

The order of a group of events may be known. For example, if all the events for a group of events are created by a single node, the order of events may be known. First, an instance may be created of an ASM associated with the object. Then, the event list may be used to cause the ASM to change states (e.g., by invoking methods of the ASM specification when encoded in Spec#). If the method names are encoded in the event messages themselves, then a mechanism such as C# Reflection may be used to find the appropriate methods.

In the course of processing events from the event list and driving the ASM, either all transitions indicated by the events may be allowed or a particular transition may not be allowed and cause an exception to occur. In the latter case, this means that one or more preconditions of the transition were violated. Either way, based on these results (and any other information derived from the ASM, such as final states of the ASM), the log validator 420 may write an appropriate success or error message to the validation log file.

There are many cases under which the true sequence of occurrence of all the events within a group of events may not be known at the time the log files are processed. This can happen, for example, if the events are logged by multiple concurrent threads on a single system, or logged into multiple log files on multiple systems. In some cases, it may be possible to use techniques such as globally incremented sequence numbers to partially order the logged events.

If the correct ordering of a group of events is not known, the log validator 420 may attempt all possible sequentially consistent interleavings of the events until a valid ordering is found or no valid ordering exists. A sequentially consistent interleaving is a serialization of events from one or more log files that does not violate any partial ordering that may exist among the logged events.

Creating a correct interleaving of the events for a particular object instance may be performed by defining a node abstraction that holds a sequential trace of events associated with the particular object instance. In this context, a "node" may correspond to a thread of execution running on one of the machines in the distributed network.

Following is an exemplary definition of a node structure using AsmL syntax:

```
type Event
type EventTrace as Seq of Event
structure Node
    trace as EventTrace    // a list of trace events for an object instance
                           // generated on this node
    index as Integer = 0   // a counter to keep track of the next event to
                           // process
```

An exemplary executable ASM specification of an object may be encoded by the following class.

```
class StatemachineModel
    IsEventEnabled(event as Event) as Boolean
    ProcessEvent(event as Event)
```

The IsEventEnabled method may determine whether the specified event yields a valid transition when applied to the current state of the ASM. The ProcessEvent method may apply the transition specified by the event, advancing the ASM's current state.

A scheduler class that generates a global interleaving of trace events from the traces collected across all nodes may be defined as follows:

```
type NodeList as Seq of Node
class Scheduler
    model as StatemachineModel
    nodes as NodeList                        // the list of nodes, each
                                             // containing a trace of events
    interleavedTrace as EventTrace = [ ]     // a valid global interleaving
                                             // of all events (from all nodes),
                                             // if such an interleaving exists
    Scheduler(model as StatemachineModel, nodes as NodeList)
```

A helper function may nondeterministically choose the next event to process. Since the events on a given node may be chosen in order (to ensure sequential consistency in the interleaved trace), choosing the next event is equivalent to choosing the next node from which to pick an event in order to process it.

```
class Scheduler
    void PickAndProcessNextEvent( )
        choose n in nodes where
            n.index < n.trace.Length and        // 1.  Choose the next
            currEvent = n.trace[n.index] and    //     valid event to
                                                //     process
            Model.IsEventEnabled(currEvent)
            Model.ProcessEvent(currEvent)       // 2a. Advance the state
                                                //     machine model with
                                                //     this event
            interleavedTrace.Append(currEvent}  // 3a. Append this event
                                                //     to the interleaved
                                                //     trace so far
            n.index = n.index + 1               // 4a. Increment the
                                                //     counter on this
                                                //     node to index the
                                                //     next trace event
        ifnone
            throw NoEnabledEventException( )    // 2b. Throw an exception
                                                //     if no valid
                                                //     event exists
```

The main function (e.g., FindGlobalSolution) of the scheduler class may be responsible for generating a global interleaving of trace events. This function makes use of the StateSet class defined after the main function to nondeterministically search all possible interleavings of trace events. Following is an exemplary definition for the main function of a scheduler class.

```
class Scheduler
    void FindGlobalSolution( )
        let totalNumberOfEvents =                  // 1.  Calculate the total number
            Sum{n.trace.Length : n in nodes}       //     of trace events across all
                                                   //     nodes
        var stateSet = StateSet.StateSetwithSingleInitialState
                                                   // 2.  Initialize the set of
                                                   //     possible states (each state
                                                   //     represents a different
                                                   //     interleaving)
        var i = 0
        while i < totalNumberOfEvents and not      // 3.  Choose the next event in
            stateSet.IsEmpty( )                    //     all surviving states
            stateSet :=                            //     (interleavings). This is
                stateSet.InvokeInAllStates(PickAndProcessNextEvent)
                                                   //     done until no states remain
            i := i + 1;                            //     or the maximum number of
                                                   //     events have been processed
```

```
        -continued if stateSet.IsEmpty( )
    // Handle failure          // 4a.  If no states remain, print
                                //      the longest interleaved
                                //      trace that was found
else
    // Handle success           // 4b.  If one or more states
                                //      remain (representing valid
                                //      global interleavings),
                                //      choose one and print the
                                //      interleaved trace
```

A StateSet class may be provided to search for all possible orderings of events. The StateSet class may aggregate a set of states as discussed later. The state class provides two basic functions:

The ability to create a copy of the current state (e.g., using a Fork( ) method). It returns a representation of the copied state.

The ability to restore a previously copied version of state (e.g., using a Set( ) method).

An exemplary algorithm that includes these two functions is described in a United States Patent Application entitled "STATE AS A FIRST-CLASS CITIZEN OF AN IMPERATIVE LANGUAGE," filed on Aug. 27, 2003, Ser. No. 10/650,245 which application is assigned to the assignee of this application.

An exemplary definition of the state class may comprise:

```
class State              // data-type representing a captured state
    shared Fork( ) as state  // captures a copy of the current state
    Set( )               // restores the current state to a captured state
```

In addition to this basic functionality, the state class may include a way to invoke a method, represented by a function pointer or "delegate", in a previously captured state, to provide a new captured state. The following method returns the special value null instead of a state in the case that the given delegate fails by throwing an exception.

```
class State
    InternalInvokeInState(d as Delegate) as State
        me.Set( )              // 1. Set start state of exploration
        try
            d( )               // 2. Try to execute function
            return State.Fork( ) // 3a. Yield captured result state if no error
        catch Exception
            return null        // 3b. Yield null if error occurred
```

In a normal programming language, an invocation usually has a single result. However, the modeling languages AsmL and Spec# allow the specification of nondeterminism. This nondeterminism may be introduced by the choose statement, which is discussed in Glasser et al., Abstract Communication Model for Distributed Systems, IEEE Transactions on Software Engineering, Vol. 30, No. 7, July. 2004 (hereinafter "Glasser et al.").

If the function represented by the given delegate is in fact nondeterministic, several resulting states are possible. The explore statement of AsmL as described by Glasser et al. may be used to fully explore all nondeterministic behaviors. One may think of the explore statement as a loop, which iterates over all possible choices that can be made in the loop's body. The following function shows how all resulting states can be captured.

```
class state
    InvokeInState(d as Delegate) as Set of State
        let oldState = State.Fork( )        // 1.  Save initial state
        let newStates =                      // 2.  The set of new
            explore me.InternalInvokeInState(d)  //      states is the result
                                             //      of the exploration of
                                             //      all non-det.
                                             //      behaviors of d( )
        oldState.Set( )                      // 3.  Restore old state
        return {s: s in newStates and s <> null}  // 4. Return all proper
                                             //      states
```

A StateSet datatype, which may comprise a collection of states, may be partially defined as follows:

```
class StateSet
    states as Set of State
    IsEmpty( ) as Boolean
        return states.IsEmpty
    Stateset(states as Set of State) // constructs a Stateset from a set of
        states
```

StateSet(states as Set of States)//constructs a StateSet from a set of states

An initial StateSet with exactly one state in it, here a copy of the current state, can be obtained with the following function.

```
    class StateSet
        shared StateSetWithSingleInitialState( ) as State
            return new StateSet({State.Fork( )})
```

Having a StateSet, one can invoke a method, represented by a delegate, in all contained states. The result is again a StateSet which contains the collection of all resulting states.

```
class StateSet
    InvokeInAllStates(d as Delegate) as StateSet
        let newStates = BigUnion({s.InvokeInState(d) : s in me.states})
        return new StateSet(newStates)
```

Figure 5:
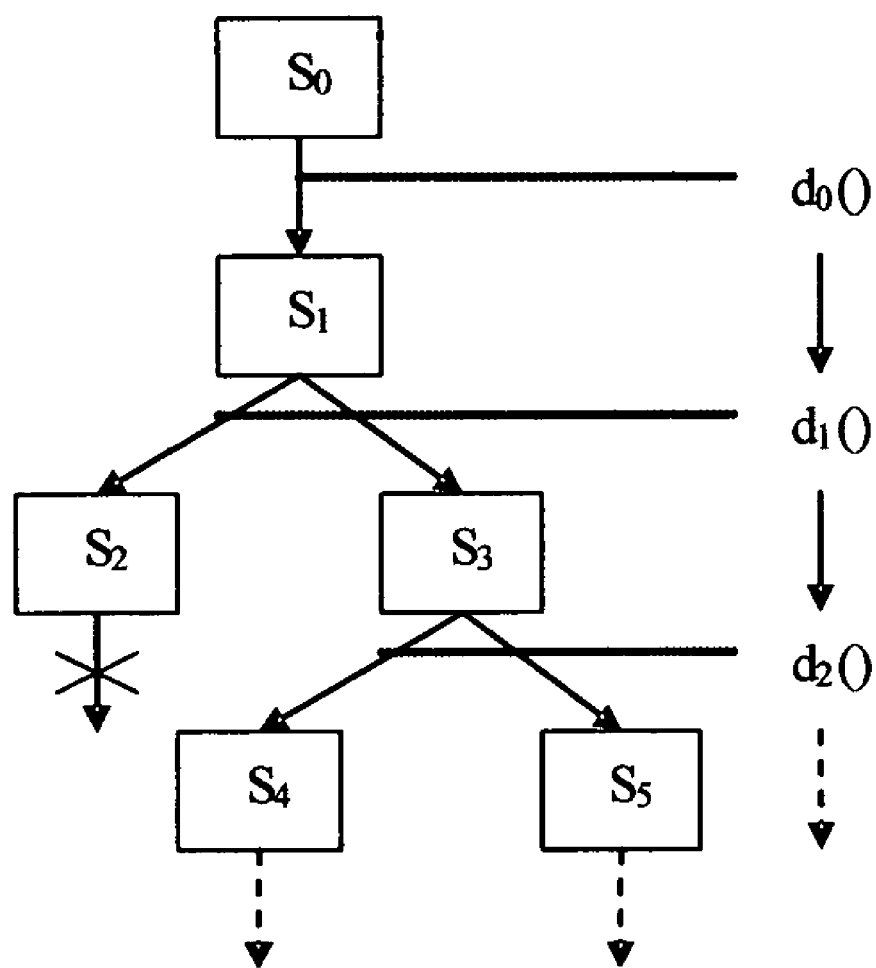
FIG. 5 is a block diagram that generally represents an exemplary evolution of a state set in accordance with aspects of the subject matter described herein.

FIG. 5 is a block diagram that generally represents an exemplary evolution of a state set in accordance with aspects of the subject matter described herein. Before the first iteration, the state set starts from an initial state set with only one state (e.g., $\{S_0\}$). After applying the method $d_0(\ )$ another state set (e.g., $\{S_1\}$) is obtained. Applying $d_1(\ )$ to this state set yields another state set (e.g., $\{S_2, S_3\}$). Applying $d_2(\ )$ on this set yields another state set (e.g., $\{S_4, S_5\}$). Applying $d_2(\ )$ to $S_2$ may not be allowed by constraints, so that state transition may be abandoned. For example, it may not be allowable to have a traffic light turn from green to red. As another example, it may not be allowable to close a TCP connection before it is opened.

Methodology Overview

Figure 6:
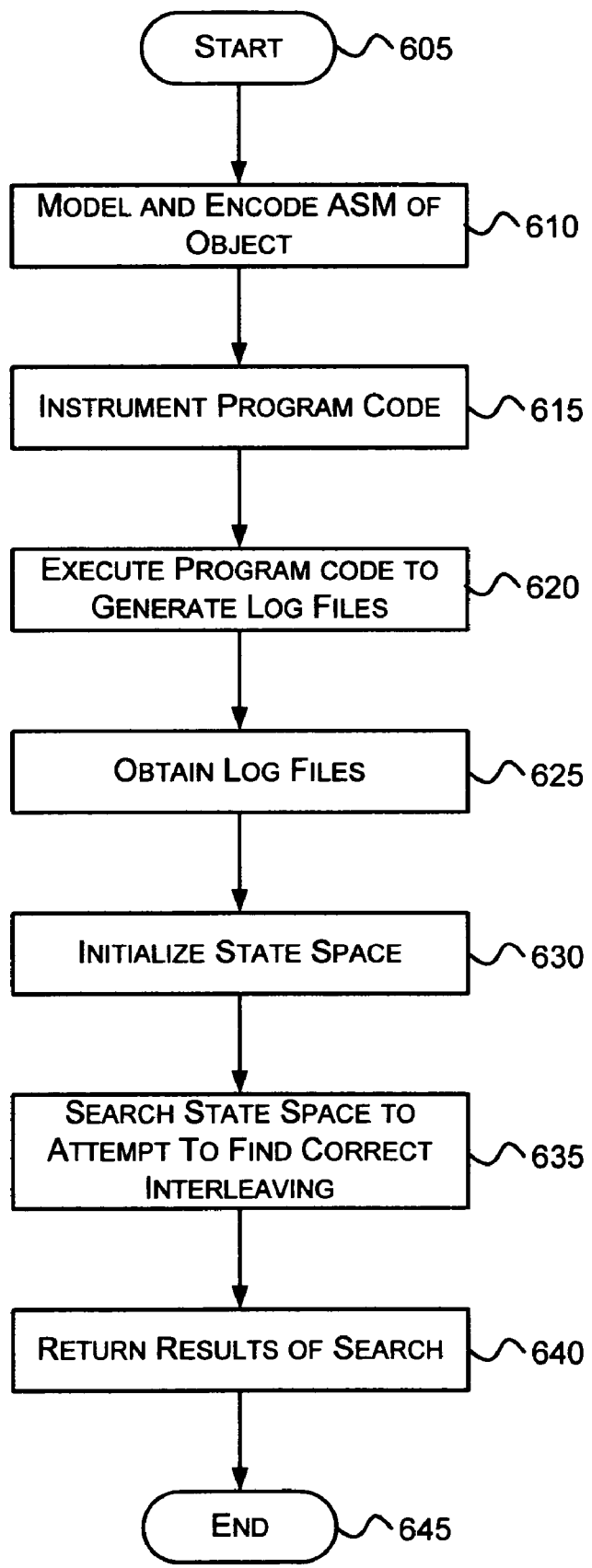
FIG. 6 is a flow diagram that generally represents actions that may occur in offline scenarios in diagnosing problems of a distributed system in accordance with aspects of the subject matter described herein.

FIG. 6 is a flow diagram that generally represents actions that may occur in offline scenarios in diagnosing problems of a distributed system in accordance with aspects of the subject matter described herein. At block 605, the actions begin.

At block 610, an object is selected and significant events are modeled and encoded into an ASM as described previously.

At block 615, program code is instrumented to generated trace statements corresponding to the modeled events.

At block 620, the program code is executed (e.g., in a distributed environment) to generate log files.

At block 625, the log files are obtained.

At block 630, a state space of a state space searcher is initialized in preparation for finding a correct interleaving of the events from the log files.

At block 635, the state space is searched in an attempt to find a correct interleaving.

At block 640, the results of the search are returned and may be logged in a results file.

At block 645, the actions end.

Figure 7A:
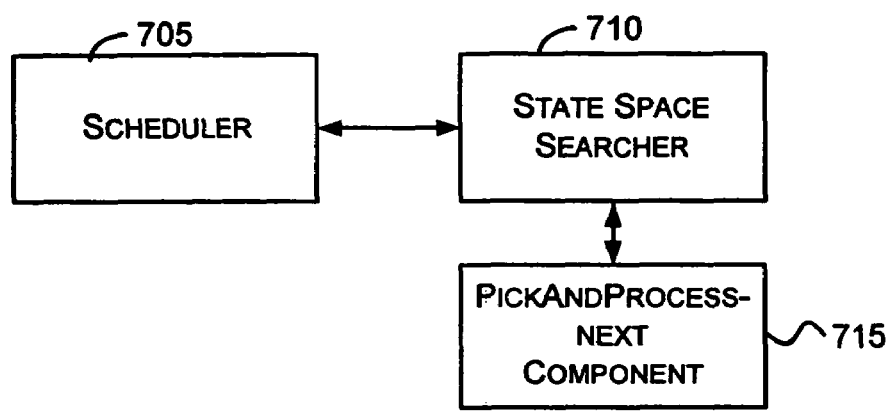
FIG. 7A is a block diagram that generally represents some components of a log validator in accordance with aspects of the subject matter described herein.
Figure 7B:
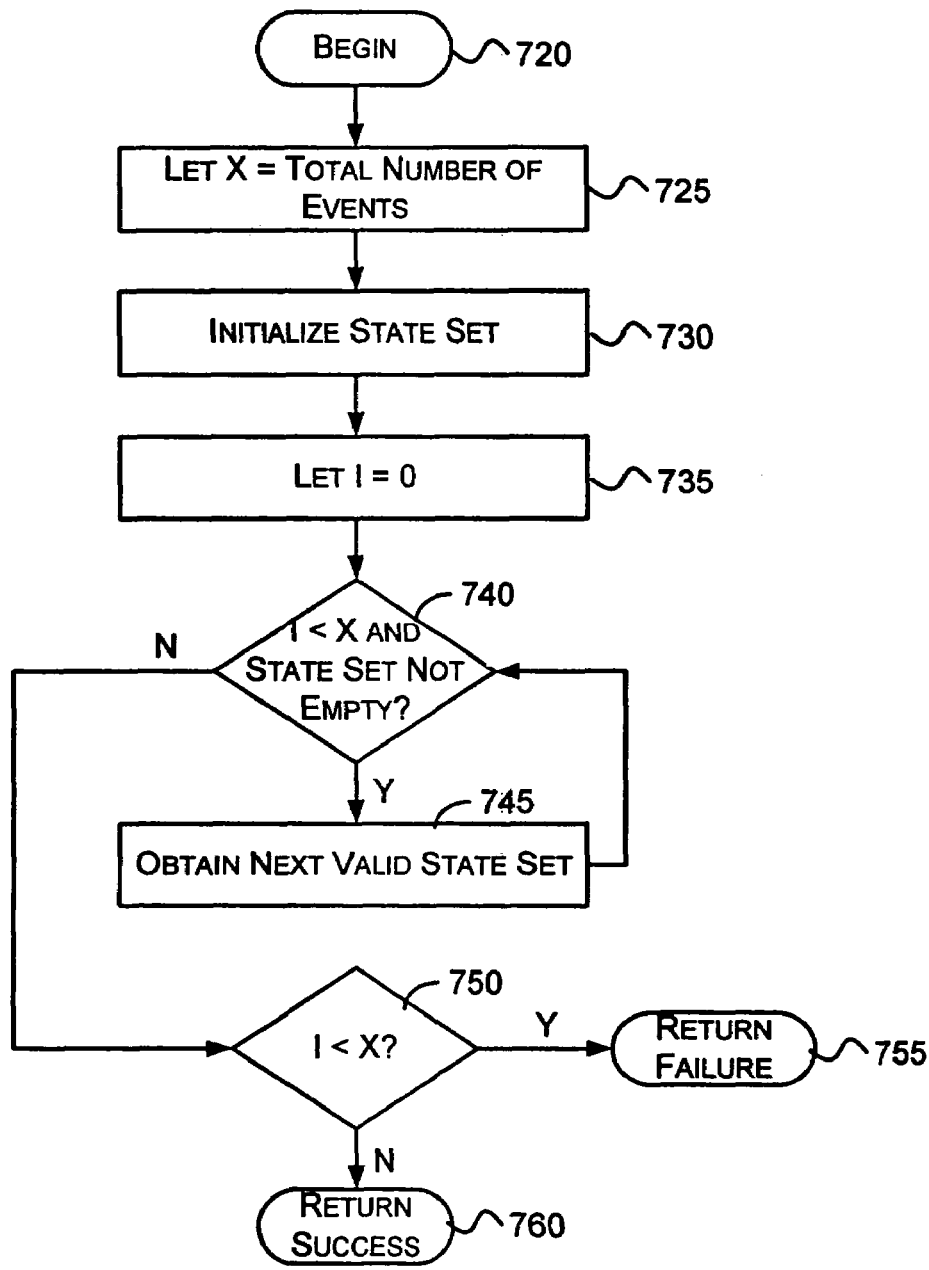
FIG. 7B is a flow diagram that generally represent exemplary steps that may occur in the interaction of the components of FIG. 7A in accordance with aspects of the subject matter described herein.

Exemplary actions that may occur in blocks 630, 635, and 640 are described in more detail in conjunction with FIGS. 7A and 7B. FIG. 7A is a block diagram that generally represents some components of a log validator in accordance with aspects of the subject matter described herein. FIG. 7B is a flow diagram that generally represent exemplary steps that may occur in the interaction of the components of FIG. 7A in accordance with aspects of the subject matter described herein.

Turning to FIGS. 7A and 7B, after a search for a correct interleaving is started (e.g., block 720), a scheduler 705 may first determine the total number of events in the log files for a particular object instance (e.g., block 725). For the particular object instance, the longest interleaved list of events may not have more events than the total number of events in the log files.

The scheduler 705 may then initialize a state space searcher 710 and set it to a starting state (e.g., block 730). The scheduler 705 may then prepare to iterate different possible interleavings by initializing a loop variable (e.g., block 735).

If the length of the current interleaved list is less than the total number of events and the state space is not empty, the scheduler 705 may request that the state space searcher 710 return the next valid state set (e.g., blocks 740-745). In requesting this, the scheduler 605 may pass a pointer (or delegate) to a function (e.g., the PickAndProcessNextEvent component 715) that the state space searcher 710 may call to ask if a particular transition is valid. An ASM (e.g., created from the ASM specification 410 of FIG. 4) may drive the PickAndProcessNextEvent component 715 via an IsEventEnabled method. In determining whether an event is allowable at a current state of the ASM, the PickAndProcessNextEvent component 715 may call the IsEventEnabled method with the event. If the event is allowable, the PickAndProcessNextEvent component 715 processes it, thereby advancing the state according to the event. The state space searcher 710 calls this function on every state in the current state set, and returns the set of advanced states.

The scheduler 705 continues asking for more subsequent state sets until the length of the interleaved trace is equal to the total number of events for the particular object instance or until the state set returned is empty (e.g. block 740-745).

If the length of the interleaved trace is equal to the total number of events, a correct interleaved trace has been found and success may be returned (e.g., block 760). If not, a correct interleaved trace has not been found and failure may be returned (e.g., block 755).

The state space searcher 710 is responsible for returning a non-empty state set reachable from the current state set by applying the given function supplied to the PickandProcessNext component 715, or indicating that no valid state is reachable from the current state set by applying the given function. It may do this in a variety of ways without departing from the spirit or scope of aspects of the subject matter described herein.

For example, the state space searcher 710 may lazily search the state space. That is, it may not attempt to find all valid nodes immediately with each iteration. Rather, after it finds a first valid state (if it exists), it may return success. If a valid state leads to an interleaved list whose length is less than the total number of events, the state space searcher 710 may backtrack and search other branches of the state space in an attempt to find a valid state at a depth in the search space corresponding to the current iteration. For example, referring to FIG. 5, if the state space searcher 710 had chosen $S_2$ at $d_1(\ )$ and was asked to find another state, it could backtrack and obtain $S_3$ before searching for $S_4$ or $S_5$ during $d_2(\ )$.

In some embodiments, the space searcher 710 may be comprised of multiple threads executing on one or more processors or may be comprised in some other parallel configuration. The state space searcher 710 may take advantage of this to search the state space in parallel.

Figure 8:
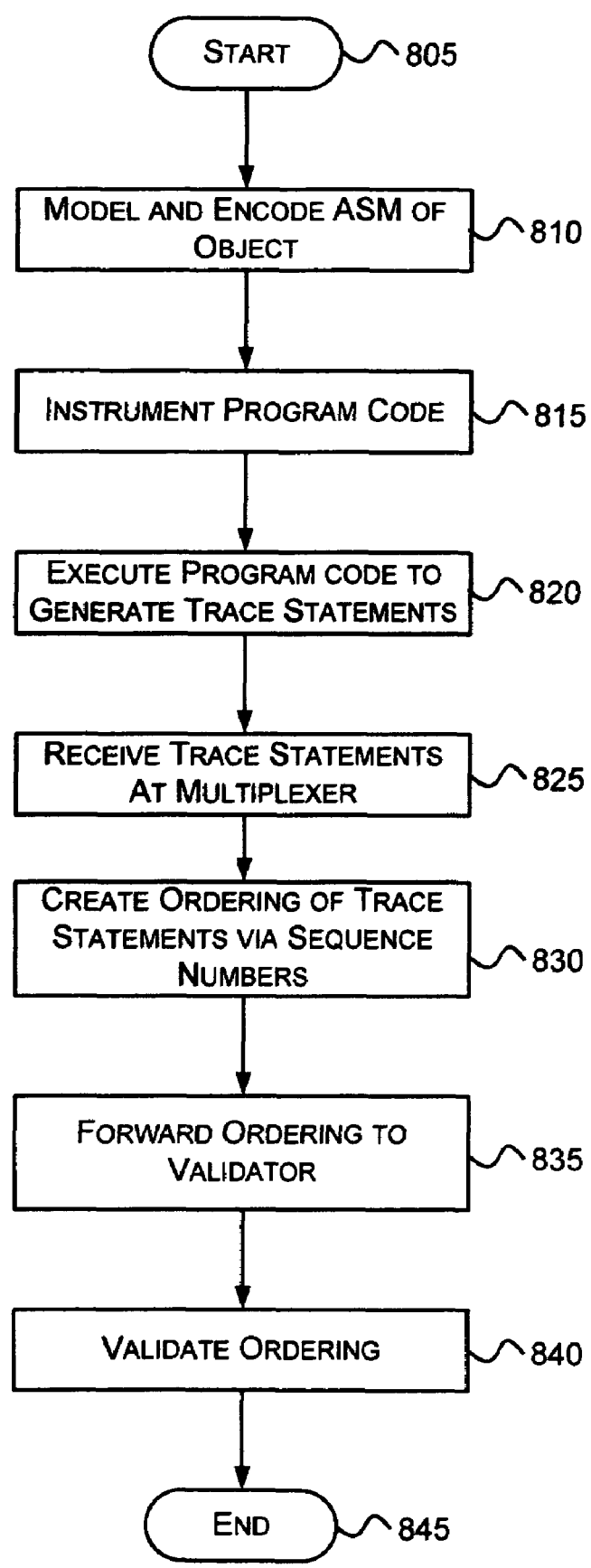
FIG. 8 is a flow diagram that generally represents actions that may occur in online scenarios in diagnosing problems of a distributed system in accordance with aspects of the subject matter described herein.

FIG. 8 is a flow diagram that generally represents actions that may occur in online scenarios in diagnosing problems of a distributed system in accordance with aspects of the subject matter describe herein. At block 805, the actions begin.

At block 810, an object is selected and significant events are modeled and encoded into an ASM.

At block 815, program code is instrumented to generate trace statements corresponding to the modeled events and to send these trace statements to a multiplexer when the program code is executed.

At block 820, the program code is executed (e.g., in a distributed environment) to generate and send the trace statements to the multiplexer.

At block 825, the trace statements are received at the multiplexer.

At block 830, a correct ordering for events associated with each object instance via sequence numbers transmitted with or derived from the trace statements.

At block 835, the ordering is forwarded to a validator.

At block 840, the ordering is validated using the ASMs of object instances.

At block 845, the actions end.

Skipped States

An ASM specification may be constructed so that it allows one or more states to be skipped to still produce a valid interleaving. For example, in a TCP connection, an open connection event may not be logged in a log file. Later, however, an event may be logged that indicates that data was transmitted with the TCP connection or that the TCP connection migrated to a node. The ASM specification may indicate that it is allowable to skip certain states but not allowable to skip other states. Further, the ASM specification may indicate how often a state may be skipped without generating an error.

In one embodiment, each object instance may carry with it a sequence number that is updated by program code executing on the nodes with each transition of interest. When the ASM specification is executed by applying events from a log file, if a skipped number corresponds to a skipped state, the ASM may indicate that the transition is allowable. A counter may be atomically incremented to avoid race conditions.

In another embodiment, an ASM specification may track statistics of how often an event is skipped and indicate through proper coding of the IsEventEnabled method whether a transition may be skipped.

Note that allowing for skipped states in the object's model may be performed without explicitly modeling these skipped states with additional states and transitions in the ASM specification. This may be done, for example, because adding a single transition and/or state to the ASM to model a skipped state may result in exponential increase in the overall state space that needs to be searched.

In another embodiment, the ASM specification may be augmented to indicate that a state is optional and data may be collected as to how often the state is skipped. If the state is skipped more frequently than a given threshold, the validator may determine that an error has occurred.

TCP Connection Migration Example

Following is an exemplary application of some of the techniques describe above with respect to TCP activity. Those of skill in the art will readily recognize other applications to which aspects of the invention as described herein may be applied.

A migrated TCP connection is one that is temporarily accepted by one node, the "migrator", and subsequently migrated to another node, the "migratee". If the migrator and migratee are the same node, then the transfer is a "local" migration; if they are different nodes, the transfer is a "remote" migration. The migration process may be transparent to both the client and the host application that will eventually service the client's request.

Minimal classes may be defined for representing a TCP connection and an event that occurs in its lifecycle. For the connection, a TCP 4-tuple (source/destination IP address and port) may be stored; for the event, the event message and the type of node that generated the event (migrator or migratee) may be stored.

```
structure TCPMConn
    string sourceIP
    int sourcePort
    string destIP
    int destPort
structure TCPMEvent
    string message
    string nodeType
// Declare the acceptable node types
    string MIGRATOR_NODE = "MIGRATOR"
    string MIGRATEE_NODE = "MIGRATEE"
    string LOCAL_NODE = "LOCAL"
    string UNDEF_NODE = "NONE"
```

The set of possible states of a migrated TCP connection is defined in the enumeration below. Depending on whether the current node is a migrator or migratee, only a subset of these states may be valid at any given time.

```
enumeration TCPConnState
    TCP_SYN_RCVD,
    TCP_ESTABLISHED,
    TCP_MIGRATING,
    TCP_MIGRATED,
    TCP_CLOSING,
    TCP_CLOSED,
    TCP_CLOSED_FAILURE
```

The first two states (TCP_SYN_RCVD and TCP_ESTABLISHED) may be only valid on the migrator, since it is the node that will be accepting the TCP connection; the remaining states may be valid on both migrator and migratee.

An ASM specification may be defined to drive the state searcher for a single migrated TCP connection. The ASM specification may include state variables and basic accessor methods to obtain the current values of the state variables. The ASM specification may also include methods to handle the events that occur during the migration process; these event handlers model the transitions of the ASM. The ASM specification may be defined in a way which allows nondeterministic behavior.

State Variables

A variable of type TCPMConn may be declared to store the 4-tuple of the migrated TCP connection. Two variables of type TCPConnState may be declared to keep track of the migrator and migratee states, respectively; these variables may be initially set to the TCP_CLOSED state.

```
class TCPConnASM
    TCPMConn tcpConn
    TCPConnState mrState = TCPConnState.TCP_CLOSED
    TCPConnState meState = TCPConnState.TCP_CLOSED
    ...
```

For local migrations, the migrator state variable (mrState) may be used, since the migrator and migratee are the same node. For remote migrations, both migrator and migratee state variables may be used. To make this distinction clear, another state variable may be declared that indicates whether the migration is local or remote.

```
class TCPConnASM
    ...
    bool isLocalMigration = true
    ...
```

Event Handlers

The methods below handle relevant events that occur during TCP connection migration (i.e., events that cause transitions in the ASM). Each method may be named after the event that it handles. Invoking a method causes the corresponding ASM transition to occur.

The first set of methods represents the standard-mode events that may occur during a normal connection migration process:

```
class TCPConnASM
    ...
    TCPConnASM(string sourceIP, int sourcePort, string destIP,
    int destPort)
        tcpConn.sourceIP = sourceIP
        tcpConn.sourcePort = sourcePort
        tcpConn.destIP = destIP
        tcpConn.destPort = destPort)
    // Event handler for receiving a SYN packet.
    void Received_SYN(string nodeType)
        requires nodeType = UNDEF_NODE
        requires mrState = TCPConnState.TCP_CLOSED
        mrState = TCPConnState.TCP_SYN_RCVD
    // Event handler for receiving an ACK packet.
    void Received_ACK(string nodeType)
        requires nodeType = UNDEF_NODE
        requires mrState = TCPConnState.TCP_SYN_RCVD
        mrState = TCPConnState.TCP_ESTABLISHED
    // Event handler for receiving a FIN packet.
    void Received_FIN(string nodeType)
        requires isLocalMigration = false
        requires nodeType = MIGRATEE_NODE
        requires meState = TCPConnState.TCP_MIGRATED
        meState = TCPConnState.TCP_CLOSING
    // Event handler for receiving a RST packet.
    void Received_RST(string nodeType)
        requires nodeType <> UNDEF_NODE
        requires isLocalMigration = false
        if nodeType = MIGRATOR_NODE
            requires mrState = TCPConnState.TCP_SYN_RCVD or
                mrState = TCPConnState.TCP_MIGRATED
            mrState = TCPConnState.TCP_CLOSED
        else if nodeType = MIGRATEE_NODE
            requires meState = TCPConnState.TCP_MIGRATED or
                meState = TCPConnState.TCP_CLOSING
            meState = TCPConnState.TCP_CLOSED
    // Event handler for receiving the first data packet of a connection.
    void Received_First_Data_packet(string nodeType)
        requires nodeType = MIGRATOR_NODE or nodeType =
            LOCAL_NODE
        requires mrState = TCPConnState.TCP_ESTABLISHED
        mrState = TCPConnState.TCP_MIGRATING
        if nodeType = MIGRATOR_NODE
            isLocalMigration = false
        else
            isLocalMigration = true
    // Event handler for receiving a migrate request on the migratee
    // (target) side.
    void Received_Migrate_Request(string nodeType)
        requires isLocalMigration = false
        requires nodeType = MIGRATEE_NODE
        requires mrState = TCPConnState.TCP_MIGRATING
        requires meState = TCPConnState.TCP_CLOSED
        meState = TCPConnState.TCP_MIGRATING
    // Event handler for completing a local migration.
    void Completed_Local_Migration(string nodeType)
        requires isLocalMigration = true
        requires nodeType = LOCAL_NODE
        requires mrState = TCPConnState.TCP_MIGRATING
        mrState = TCPConnState.TCP_MIGRATED
    // Event handler for completing a remote migration on the migrator
    // (remote) side.
    void Completed_Remote_Migration(string nodeType)
        requires isLocalMigration = false
        requires nodeType = MIGRATOR_NODE
        requires mrState = TCPConnState.TCP_MIGRATING
        requires meState = TCPConnState.TCP_MIGRATING or
            meState = TCPConnState.TCP_MIGRATED
        mrState = TCPConnState.TCP_MIGRATED
    // Event handler for completing a remote migration on the migratee
    // (target) side.
    void Completed_Target_Migration(string nodeType)
        requires isLocalMigration = false
        requires nodeType = MIGRATEE_NODE
        requires meState = TCPConnState.TCP_MIGRATING
        // This may not always be the case, but we enforce it for now:
        requires mrState = TCPConnState.TCP_MIGRATED
        meState = TCPConnState.TCP_MIGRATED
    // Event handler for closing a connection during a local migration.
```

```
    void Closed_Connection(string nodeType)
        requires isLocalMigration = true
        requires nodeType = LOCAL_NODE
        requires mrState = TCPConnState.TCP_MIGRATED
        mrState = TCPConnState.TCP_CLOSED
    ...
```

The second set of methods represents the failure-mode events, which may or may not be included in the ASM specification depending on whether or not these events are logged by the application:

```
class TCPConnASM
    ...
    // Failure event handler for processing a migrate request on the
    // migratee side.
    void Failed_process_Migrate_Request(string nodeType)
        requires isLocalMigration = false
        requires nodeType = MIGRATEE_NODE
        requires mrState = TCPConnState.TCP_MIGRATING
        requires meState = TCPConnState.TCP_MIGRATING
        meState = TCPConnState.TCP_CLOSED_FAILURE
    // Failure event handler for processing a migrate response on the
    // migrator side.
    void Failed_Process_Migrate_Response(string nodeType)
        requires isLocalMigration = false
        requires nodeType = MIGRATOR_NODE
        requires mrState = TCPConnState.TCP_MIGRATING
        requires meState = TCPConnState.TCP_MIGRATING
        mrState = TCPConnState.TCP_CLOSED_FAILURE
    // Failure event handler for initiating a migration.
    void Failed_Initiate_Migration(string nodeType)
        requires nodeType <> UNDEF_NODE
        if nodeType = MIGRATOR_NODE or nodeType = LOCAL_NODE
            if nodeType = MIGRATOR_NODE
                requires isLocalMigration = false
            else
                requires isLocalMigration = true
            requires mrState = TCPConnState.TCP_MIGRATING
            mrState = TCPConnState.TCP_CLOSED_FAILURE
        else
            requires isLocalMigration = false
            requires meState = TCPConnState.TCP_MIGRATING
            meState = TCPConnState.TCP_CLOSED_FAILURE
    // Failure event handler for initiating a local migration.
    void Failed_Initiate_Local_Migration(string nodeType)
        requires isLocalMigration = true
        requires nodeType = LOCAL_NODE
        requires mrState = TCPConnState.TCP_MIGRATING
        mrState = TCPConnState.TCP_CLOSED_FAILURE
    // Failure event handler for initiating a remote migration on the
    // migrator (remote) side.
    void Failed_Initiate_Remote_Migration(string nodeType)
        requires isLocalMigration = false
        requires nodeType = MIGRATOR_NODE
        requires mrState = TCPConnState.TCP_MIGRATING
        mrState = TCPConnState.TCP_CLOSED_FAILURE
    // Failure event handler for initiating a remote migration on the
    // migratee (target) side.
    void Failed_Initiate_Target_Migration(string nodeType)
        requires isLocalMigration = false
        requires nodeType = MIGRATEE_NODE
        requires mrState = TCPConnState.TCP_MIGRATING
        meState = TCPConnState.TCP_CLOSED_FAILURE
    // Failure event handler for completing a migration.
    void Failed_Complete_Migration(string nodeType)
        requires nodeType <> UNDEF_NODE
        if nodeType = MIGRATOR_NODE or nodeType = LOCAL_NODE
            if nodeType = MIGRATOR_NODE
                requires isLocalMigration = false
            else
                requires isLocalMigration = true
            requires mrState = TCPConnState.TCP_MIGRATING
            mrState = TCPConnState.TCP_CLOSED_FAILURE
```

-continued

```
    else
        requires isLocalMigration = false
        requires meState = TCPConnState.TCP_MIGRATING
        meState = TCPConnState.TCP_CLOSED_FAILURE
// Failure event handler for completing a local migration.
void Failed_Complete_Local_Migration(string nodeType)
    requires isLocalMigration = true
    requires nodeType = LOCAL_NODE
    requires mrState = TCPConnState.TCP_MIGRATING
    mrState = TCPConnState.TCP_CLOSED_FAILURE
// Failure event handler for completing a remote migration on the
// migrator (remote) side.
void Failed_Complete_Remote_Migration(string nodeType)
    requires isLocalMigration = false
    requires nodeType = MIGRATOR_NODE
    requires mrState = TCPConnState.TCP_MIGRATING
    mrState = TCPConnState.TCP_CLOSED_FAILURE
// Failure event handler for completing a remote migration on the
// migratee (target) side.
void Failed_Complete_Target_Migration(string nodeType)
    requires isLocalMigration = false
    requires nodeType = MIGRATEE_NODE
    requires mrState = TCPConnState.TCP_MIGRATING
    meState = TCPConnState.TCP_CLOSED_FAILURE
// Failure event handler for classifying a connection.
void Failed_Classify_Connection(string nodeType)
    requires nodeType = UNDEF_NODE
    requires mrState = TCPConnState.TCP_ESTABLISHED
    mrState = TCPConnState.TCP_CLOSED_FAILURE
```

Nondeterministic Exploration

Often, the order of the events associated with a migrated TCP connection may not be known. This is mainly due to the fact that the events of a migrated connection occur on different nodes, and so even if traces are collected from each node, there is no predefined rule for determining the correct interleaving of these trace events. This may be addressed by using a nondeterministic mechanism.

A node abstraction may be defined for representing a trace collected on a single node. A scheduler class that uses the state searcher may nondeterministically attempt different interleavings of traces (as described previously) until a valid one is found. The scheduler class may be executed to obtain validation results.

Scheduler Class

The scheduler class drives the nondeterministic exploration of a TCP connection ASM specification. In addition, the scheduler class may build and store the interleaved trace as well as a result string indicating whether or not the interleaving was successful.

The PickAndProcessNextEvent method nondeterministically chooses a node from which to select the next trace event, one node at a time, and builds the interleaved trace incrementally. The PickAndProcessNextEvent method may be called from outside as often as necessary; backtracking may be done in the caller's side in response to failed events.

The scheduler may use the PickAndProcessNextEvent method above and state searcher to find a correct interleaving of the trace events (or print a meaningful error if none exists). It may keep track of the set of states of the ASM of the underlying TCP specification that are possible at any point in time. It may then obtain new state sets using the PickAndProcessNextEvent method as many times as there are trace events in the different nodes to consume. Each invocation may start at the current state set and then create a new state set in which all states of the ASM of the TCP specification have evolved according to the event chosen by the PickAndProcessNextEvent method. Finally, a success message may be stored in the result string if a possible state remains at the end (indicating that a valid interleaving was found). Otherwise, a failure message may be stored.

Analyzing Distributed Systems

Besides helping to verify that the traces generated by a real-world system conform to an abstract model of the system, aspects described herein also provide a structured way to analyze the running of a system. This can help in understanding how the system operates and in diagnosing problems in the field as instrumented program code and validators may be shipped to customer sites or elsewhere.

One way to analyze a system is to use the traces to drive the executable specification and have the validator maintain a count of "significant" states or state transitions in the abstract model. In this context, examples of "significant" states are unusual states that represent potential error conditions that can occur in the field (for example, conditions produced by the inability to obtain some resource or the overloading of some component).

It should be noted that these conditions may not be violations of the abstract model and may rather represent unusual events. In online scenarios, the validator may display a real-time running display giving statistics of these significant events. In offline scenarios, the validator may display the statistics of the system after a period of time.

Further, displayed information may be displayed in the language of the abstract model. It will be recognized that this may be much more understandable and actionable than simply displaying low-level trace information, especially if the traces are generated in an ad-hoc fashion. For example, with respect to the connection migration example, the validator may report the number of connections received, accepted, handed-off successfully, dropped half-way, and so forth, using the language of the abstract model of the system. Aspects described herein may further allow a user to drill down into (for example) specific dropped calls to determine why it was abandoned by pulling together information from multiple machines.

By contrast, directly viewing multiple logs which include information for millions of unrelated events and trying to manually piece together what is happening is typically an extremely time consuming task and in many cases is simply unfeasible because of the sheer number of events involved.

Thus, aspects described herein provide a way for operators in the field to understand the operation of a complex, potentially distributed system in the higher level terms of an abstract model of the system and this provides benefits that go beyond simply verifying that the implementation conforms to a specification.

As can be seen from the foregoing detailed description, aspects have been described for diagnosing problems in distributed systems. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A computer-readable storage medium having computer-executable instructions which when executed perform a method for determining an order for a plurality of traces, the method comprising:

modeling the lifecycle of a distributed system as an abstract state machine having a set of states and transitions between the states that correspond to events that occur in the distributed system;

adding trace statements to program code of the distributed system, wherein each trace statement corresponds to an event that occurs in the distributed system such that upon a trace statement being executed by a processor, the trace statement generates a trace that includes an indication that that the corresponding event has occurred;

recording each generated trace in one of one or more log files;

receiving the one or more log files containing the generated traces;

upon receiving the one or more log files, initializing the abstract state machine to a current state;

for each of the traces in the one or more log files, performing steps (1)-(3):
  (1) selecting the trace;
  (2) determining that the event indicated by the trace is an event that advances the abstract state machine from the current state to a next state; and
  (3) upon determining that the event indicated by the trace advances the abstract state machine, storing the trace in an interleaving that indicates a correct ordering of the traces, and advancing the state of the abstract state machine to the next state;

after performing steps (1)-(3) for each of the traces in the one or more log files, examining the interleaving to determine whether the number of traces in the interleaving equals the total number of generated traces in the one or more log files; and upon determining that the number of traces in the interleaving equals the total number of generated traces, indicating that the correct interleaving of the traces was found.

2. The computer-readable storage medium of claim 1, wherein the traces are generated by program code executing on a plurality of nodes.

3. The computer-readable storage medium of claim 1, wherein indicating whether the correct interleaving was found comprises indicating that the correct interleaving was not found and reporting an ordering of traces that includes a longest sequence of events enabled by the states and transitions of the abstract state machine.

4. The computer-readable storage medium of claim 1, further comprising displaying a sequence of transitions of the abstract state machine that corresponds to the correct interleaving of traces of the log files.

5. The computer-readable storage medium of claim 4, wherein displaying a sequence of transitions of the abstract state machine that corresponds to the correct interleaving of the traces of the log files comprises displaying a visualization of behavior of a plurality of nodes that generated the log files.

6. The computer-readable storage medium of claim 5, further comprising diagnosing problems with the behavior of the plurality of nodes via the visualization.

7. The computer-readable storage medium of claim 1, wherein the abstract state machine is generated from a language that is executable.

8. The computer-readable storage medium of claim 1, wherein a traces comprises an identifier that identifies an object instance related to the trace, an identifier that identifies a node which generated the trace, and an identifier that identifies a transition of the object instance.

9. The computer-readable storage medium of claim 8, wherein the trace further comprises a name of a method in an abstract state machine, wherein the method is used to advance the abstract state machine to another state.

10. The computer-readable storage medium of claim 1, wherein each trace corresponds to an event of an object instance and further comprising grouping events associated with each object instance together.

11. The computer-readable storage medium of claim 1, wherein traces are directly received at a multiplexer rather than receiving a plurality of log files, and further comprising:
  receiving the traces at the multiplexer from a plurality of nodes, wherein each trace includes a sequence number that orders the trace with respect to a particular object instance;
  creating an ordering of the traces at the multiplexer via the sequence numbers; and
  forwarding the ordering to a validator arranged to determine whether the traces indicate correct behavior.

12. The computer-readable storage medium of claim 11, further comprising comparing the ordering of the traces with the abstract state machine that includes states and transitions between pairs of states to determine whether the ordering of the traces indicates behavior that is valid with respect to the abstract state machine.

13. The computer-readable storage medium of claim 11, wherein the abstract state machine models object behavior with less than all events related to the object.

14. In a computing environment, a system, comprising:
a processor; and
memory storing instructions which when executed by the processor perform a method for determining an order for a plurality of traces, the method comprising:
  modeling the lifecycle of a distributed system as an abstract state machine having a set of states and transitions between the states that correspond to events that occur in the distributed system;
  adding trace statements to program code of the distributed system, wherein each trace statement corresponds to an event that occurs in the distributed system such that upon a trace statement being executed by a processor, the trace statement generates a trace that includes an indication that that the corresponding event has occurred;
  recording each generated trace in one of one or more log files;
  receiving the one or more log files containing the generated traces;
  upon receiving the one or more log files, initializing the abstract state machine to a current state;
  for each of the traces in the one or more log files, performing steps (1)-(3):
    (1) selecting the trace;
    (2) determining that the event indicated by the trace is an event that advances the abstract state machine from the current state to a next state; and
    (3) upon determining that the event indicated by the trace advances the abstract state machine, storing the trace in an interleaving that indicates a correct ordering of the traces, and advancing the state of the abstract state machine to the next state;
  after performing steps (1)-(3) for each of the traces in the one or more log files, examining the interleaving to determine whether the number of traces in the interleaving equals the total number of generated traces in the one or more log files; and upon determining that the number of traces in the interleaving equals the total number of generated traces, indicating that the correct interleaving of the traces was found.

15. The system of claim 14, wherein the step of determining that the event indicated by the trace is an event that advances the abstract state machine from the current state to a next state further comprises:

determining that the event does not advance the abstract state machine, and further determining that the event advances the abstract state machine from a subsequent state to the next state, the subsequent step being reachable by skipping the current state, and that it is allowable to skip the current state, such that the corresponding trace is added to the interleaving even though the event does not advance the abstract state machine from the current state.

16. A method for determining an order for a plurality of traces, the method comprising:

modeling the lifecycle of a distributed system as an abstract state machine having a set of states and transitions between the states that correspond to events that occur in the distributed system;

adding trace statements to program code of the distributed system, wherein each trace statement corresponds to an event that occurs in the distributed system such that upon a trace statement being executed by a processor, the trace statement generates a trace that includes an indication that that the corresponding event has occurred;

recording each generated trace in one of one or more log files;

receiving the one or more log files containing the generated traces;

upon receiving the one or more log files, initializing the abstract state machine to a current state;

for each of the traces in the one or more log files, performing steps (1)-(3):
  (1) selecting the trace;
  (2) determining that the event indicated by the trace is an event that advances the abstract state machine from the current state to a next state; and
  (3) upon determining that the event indicated by the trace advances the abstract state machine, storing the trace in an interleaving that indicates a correct ordering of the traces, and advancing the state of the abstract state machine to the next state;

after performing steps (1)-(3) for each of the traces in the one or more log files, examining the interleaving to determine whether the number of traces in the interleaving equals the total number of generated traces in the one or more log files; and upon determining that the number of traces in the interleaving equals the total number of generated traces, indicating that the correct interleaving of the traces was found.

* * * * *